US010877901B2

(12) United States Patent
Bryant et al.

(10) Patent No.: US 10,877,901 B2
(45) Date of Patent: Dec. 29, 2020

(54) METHOD AND APPARATUS FOR UTILIZING PROXY IDENTIFIERS FOR MERGING OF STORE OPERATIONS

(71) Applicant: ARM LIMITED, Cambridge (GB)

(72) Inventors: Richard F. Bryant, Chandler, AZ (US); Kim Richard Schuttenberg, Gilbert, AZ (US); Lilian Atieno Hutchins, Chandler, AZ (US); Thomas Edward Roberts, Cambridge (GB); Alex James Waugh, Cambridge (GB); Max John Batley, Cottenham (GB)

(73) Assignee: ARM Limited, Cambridge (GB)

( * ) Notice: Subject to any disclaimer, the term of this patent is extended or adjusted under 35 U.S.C. 154(b) by 199 days.

(21) Appl. No.: 15/632,654

(22) Filed: Jun. 26, 2017

(65) Prior Publication Data

US 2017/0293567 A1    Oct. 12, 2017

Related U.S. Application Data

(63) Continuation-in-part of application No. 15/254,233, filed on Sep. 1, 2016, now abandoned.

(30) Foreign Application Priority Data

Sep. 25, 2015 (GB) .................................. 1516967.5

(51) Int. Cl.
*G06F 12/00* (2006.01)
*G06F 12/1027* (2016.01)
(Continued)

(52) U.S. Cl.
CPC ...... *G06F 12/1027* (2013.01); *G06F 9/30043* (2013.01); *G06F 9/467* (2013.01);
(Continued)

(58) Field of Classification Search
CPC ............ G06F 12/1027; G06F 12/1054; G06F 2212/682; G06F 9/3834; G06F 12/0815; G06F 2212/1008; G06F 2212/1016
See application file for complete search history.

(56) References Cited

U.S. PATENT DOCUMENTS 6,145,054 A * 11/2000 Mehrotra ............ G06F 12/0859
711/119
6,374,341 B1   4/2002 Nijhawan
(Continued)

OTHER PUBLICATIONS

Combined Search and Examination Report for GB 1516967.5, dated Mar. 23, 2016, 6 pages.
(Continued)

*Primary Examiner* — Arvind Talukdar
(74) *Attorney, Agent, or Firm* — Nixon & Vanderhye, P.C.

(57) ABSTRACT

An apparatus comprises processing circuitry to process data access operations specifying a virtual address of data to be loaded from or stored to a data store, and proxy identifier determining circuitry to determine a proxy identifier for a data access operation to be processed by the data access circuitry, the proxy identifier having fewer bits than a physical address corresponding to the virtual address specified by the data access operation. The processing circuitry comprises at least one buffer to buffer information (including the proxy identifier) associated with one or more pending data access operations awaiting processing. Address translation circuitry determines the physical address corresponding to the virtual address specified for a data access operation after that data access operation has progressed beyond said at least one buffer.

10 Claims, 9 Drawing Sheets

(51) Int. Cl.

| | |
|---|---|
| *G06F 12/1009* | (2016.01) |
| *G06F 9/46* | (2006.01) |
| *G06F 9/30* | (2018.01) |
| *G06F 12/1036* | (2016.01) |
| *G06F 12/0831* | (2016.01) |
| *G06F 12/0815* | (2016.01) |

(52) U.S. Cl.
CPC ...... *G06F 12/0815* (2013.01); *G06F 12/0831* (2013.01); *G06F 12/1009* (2013.01); *G06F 12/1036* (2013.01); *G06F 2212/1008* (2013.01); *G06F 2212/1016* (2013.01); *G06F 2212/1021* (2013.01); *G06F 2212/50* (2013.01); *G06F 2212/65* (2013.01); *G06F 2212/68* (2013.01); *G06F 2212/682* (2013.01)

(56) References Cited

U.S. PATENT DOCUMENTS

| | | |
|---|---|---|
| 6,446,189 B1 | 9/2002 | Zuraski, Jr. |
| 6,470,437 B1 | 10/2002 | Lyon |
| 2003/0177326 A1 | 9/2003 | Luick |
| 2003/0177335 A1* | 9/2003 | Luick ............... G06F 9/3834 711/210 |
| 2006/0236074 A1* | 10/2006 | Williamson ........ G06F 12/0864 711/216 |
| 2013/0304991 A1* | 11/2013 | Bottcher ............ G06F 12/0864 711/122 |
| 2014/0095784 A1* | 4/2014 | Tran .................. G06F 12/1027 711/108 |
| 2014/0115297 A1 | 4/2014 | Cain, III |
| 2016/0179674 A1 | 6/2016 | Sury |

OTHER PUBLICATIONS

Woo et al., "Reducing Energy of Virtual Cache Synonym Lookup using Bloom Filters", Proceedings of the 2006 International Conference on Compilers, Architecture and Synthesis for Embedded Systems:, Oct. 22, 2006, pp. 179-189.

Final Office Action dated May 11, 2018 in co-pending U.S. Appl. No. 15/254,233, 30 pages.

U.S. Appl. No. 15/254,233, filed Sep. 1, 2016, Inventor: Waugh et al.

Office Action dated Oct. 18, 2017 in co-pending U.S. Appl. No. 15/254,233, 26 pages.

* cited by examiner

US 10,877,901 B2

METHOD AND APPARATUS FOR UTILIZING PROXY IDENTIFIERS FOR MERGING OF STORE OPERATIONS

This application is a continuation-in-part of U.S. patent application Ser. No. 15/254,233 filed on Sep. 1, 2016, and claims priority to GB Patent Application No. 1516967.5 filed on Sept. 25,2015, the entire contents of each of which are entirely incorporated herein by reference.

BACKGROUND

Technical Field

The present technique relates to the field of data processing.

Technical Background

When handling data access transactions for accessing data in a data store, such as load transactions for loading data from the data store or store transactions for storing data to the data store, it may be required to check whether two data access transactions correspond to the same physical address. This may be referred to as hazard checking. For example, hazard checking may be used to ensure that a series of data access transactions to the same location in the data store are handled in the correct order, or for improving performance by allowing successive store instructions to the same physical address to be merged.

SUMMARY

At least some examples provide an apparatus comprising:
processing circuitry to process data access operations specifying a virtual address of data to be loaded from or stored to a data store;
proxy identifier determining circuitry to determine a proxy identifier for a data access operation to be processed by the data access circuitry, the proxy identifier having fewer bits than a physical address corresponding to the virtual address specified by the data access operation;
wherein the processing circuitry comprises at least one buffer to buffer information associated with one or more pending data access operations awaiting processing, said information comprising the proxy identifier determined by the proxy identifier determining circuitry for each of said one or more pending data access operations; and
address translation circuitry to determine the physical address corresponding to the virtual address specified for a data access operation after that data access operation has progressed beyond said at least one buffer.

At least some examples provide a data processing method comprising:
in response to a data access operation specifying a virtual address of data to be loaded from or stored to a data store:
determining a proxy identifier having fewer bits than a physical address corresponding to the virtual address specified by the data access operation;
buffering information associated with the data access operation in at least one buffer, said information comprising the proxy identifier; and
after the data access operation has progressed beyond the at least one buffer, determining the physical address corresponding to the virtual address specified for the given data access operation.

At least some examples provide an apparatus comprising:
a translation lookaside buffer (TLB) comprising a plurality of TLB entries to store address translation data for translating a virtual address specified by a data access transaction to a physical address identifying a corresponding location in a data store; and
hazard checking circuitry to detect a hazard condition when two data access transactions correspond to the same physical address;
herein the hazard checking circuitry comprises a TLB entry identifier comparator to compare TLB entry identifiers identifying the TLB entries corresponding to said two data access transactions;
the hazard checking circuitry is configured to detect said hazard condition in dependence on whether the TLB entry identifier comparator detects that said TLB entry identifiers match; and
the hazard checking circuitry is configured to trigger replacement of two store operations corresponding to the same physical address with a single merged store operation when the hazard condition is detected for said two store operations.

Further aspects, features and advantages of the present technique will be apparent from the following description of examples, which is to be read in conjunction with the accompanying drawings.

DESCRIPTION OF EXAMPLES

Figure 1:
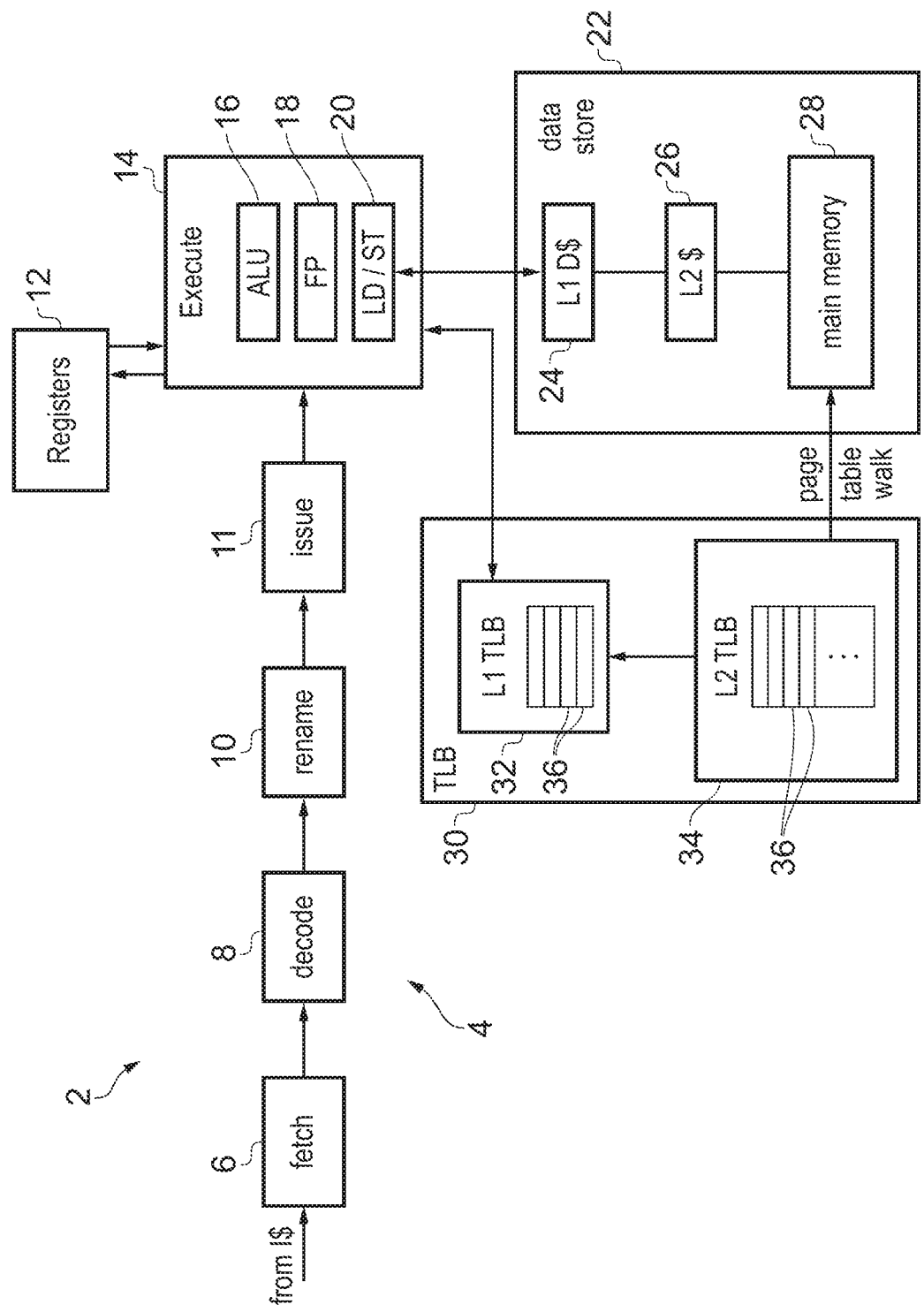
FIG. 1 schematically illustrates an example of a processing pipeline.

There may be a number of places within a data processing apparatus where different data access transactions undergo hazard checking for detecting whether two data access transactions correspond to the same physical address. For example, hazard checking circuitry could detect hazards between two pending load transactions for loading data from a given address in a data store. If the two loads correspond to the same physical address, then this may require certain ordering requirements to be satisfied to ensure correct results for example. Another example of hazard checking may be when two store transactions for storing data to a data store specify the same physical address, in which case the order in which the two stores are carried out may affect other instructions and even if the two stores are carried out in the correct order, it may be more efficient to replace the two stores with a single merged store operation which provides the same result as if the two stores were carried out in succession. Another example of hazard checking may be between a pending load and pending store operation to allow the value to be stored to the data store in response to the store operation to be forwarded to the load circuitry so that the load can be serviced before the store is carried out. Hence, there may be many reasons why it may be useful to detect hazard conditions when two data access transactions correspond to the same physical address.

Typically, hazard checking would be carried out by providing address comparators for comparing the physical addresses of respective data access transactions and triggering the hazard condition when the two transactions have the same physical address. However, the physical address may be relatively large (e.g. 44 bits), and so relatively large comparators may be required which can increase power consumption and make circuit timing requirements harder to meet. This problem scales with the number of different points of the system at which hazard checking is required, and with the number of pairs of transactions to be checked at each hazard checking point.

Many processing systems use virtual addressing where the data access transactions specify virtual addresses and the virtual addresses are translated into physical addresses identifying corresponding locations in a data store such as a cache or memory. Often a translation lookaside buffer (TLB) is provided to speed up address translation so that it is not necessary to access page tables in memory every time an address needs to be translated. The TLB has a number of TLB entries for storing address translation data for translating a virtual address within a corresponding page of the address space into a corresponding physical address.

Hazard checking circuitry can be provided with a TLB entry identifier comparator to compare TLB entry identifiers which identify the TLB entries corresponding to two data access transactions for which the hazard checking is to be performed. The hazard checking circuitry detects the hazard condition based on whether the TLB entry identifier comparator detects that the TLB entry identifiers match. The TLB entry identifiers are typically much smaller than the physical addresses and so by comparing TLB entry identifiers to detect hazards, this can avoid the need to compare the full physical addresses of the data access transactions, to make the hazarding comparators smaller and hence ease circuit timing and save power. This saving in power and area may be multiplied across the number of hazard detection points implemented in the system and so can be relatively significant.

FIG. 1 schematically illustrates an example of a data processing apparatus 2 comprising a processing pipeline 4 for performing data processing. The pipeline 4 includes a number of stages including a fetch stage 6 for fetching instructions from an instruction cache, a decode stage 8 for decoding the fetched instructions, a register renaming stage 10 for performing register renaming to map architectural register specifiers specified by the instructions to physical register specifiers identifying registers within a physical set of registers 12, and issue stage 11 for determining when operands required by instructions are ready and issuing the instructions for execution when the operands are ready, and an execute stage 14 for executing the instructions to perform corresponding data processing operations. For example the execute stage 14 may include a number of execute units for executing different kinds of instructions, such as an arithmetic/logic unit (ALU) 16 for executing arithmetic instructions such as add or multiply instructions or logical instructions such as OR or AND instructions, a floating point unit 18 for executing floating-point instructions using data values represented in floating point format, and a load/store unit 20 for executing load operations for loading data values from a data store 22 and storing them in the registers 12, or store instructions for storing data from the registers 12 to the data store 22. It will be appreciated this is just one example of a possible pipeline architecture and different stages could be provided in other examples. For example, in an in-order processor the rename stage 10 may be omitted. Similarly, it will be appreciated that the execute units 16, 18, 20 are just one example and other examples may have different combinations of execute units for executing different kinds of instructions.

As shown in FIG. 1, the data store 22 may have a hierarchical structure including one or more caches 24, 26 and a main memory 28. The level 2 (L2) cache 26 caches a subset of data from the main memory for faster access. Similarly the level 1 (L1) data cache 24 caches a smaller subset of data from the memory 28 for each faster access than the L2 cache 26. Any known caching scheme may be used to control data transfer between the respective caches and memory. In general, references to the data store 22 herein may refer to any of the caches 24, 26 and memory 28. Some embodiments may have greater or fewer levels of cache than the two levels shown in FIG. 1.

Load/store instructions executed by the pipeline 4 may identify the locations in the data store 22 to be accessed using virtual memory addresses. On the other hand the data store 22 itself may identify storage locations using a physical address. As shown in FIG. 1, a translation lookaside buffer (TLB) 30 is provided for speeding up address translations from virtual addresses to physical addresses. In this example, the TLB 30 includes two levels of translation lookaside buffers: a level 1 (L1) TLB 32 and a level 2 (L2) TLB 34. The L1 TLB 32 and L2 TLB 34 each include a number of TLB entries 36 for storing address translation for respective pages of the address space. Each entry corresponds to a corresponding page of the virtual address space and maps a virtual page address identifying that page to a corresponding physical page address in the physical address space used by the data store 22. TLB entries 36 may also specify other kinds of information such as data defining access permissions. For example the access permissions may define whether a particular process is allowed to read or write to the corresponding page of the address space. Typically the L2 TLB 34 may include a greater number of entries 36 than the L1 TLB, but the L1 TLB 32 may be faster to access. In response to a given load or store instruction specifying a virtual address, the virtual address is provided to the L1 TLB 32 and if the virtual address matches against one of the TLB entries 36 then the page address portion of the corresponding physical address is returned to the load/store unit 20 which triggers a request to the data store 22 using the physical address (an offset portion of the virtual address may be mapped unchanged to a corresponding portion of the physical address).

If the L1 TLB 32 does not contain the required entry then it sends a request to the L2 TLB which returns the entry for the required virtual page. The entry received from the L2 TLB 34 is allocated into one of the L1 TLB entries 36 and the L1 TLB 32 returns to the physical page address as before. On the other hand, if the L2 TLB 34 also does not include the required entry then the L2 TLB 34 can trigger a page table walk to request the required entry from page tables within main memory 28. Typically the page table walk is relatively slow and so by caching recently used TLB entries in the L1 or L2 TLBs 32 and 34, address translation can be made faster.

While FIG. 1 shows a TLB 30 with two levels of caching of page table entries, it will be appreciated that other numbers of levels could also be provided. For example, some examples may not have a L2 TLB 34, in which case the L1 TLB 32 could be the only TLB.

Figure 2:
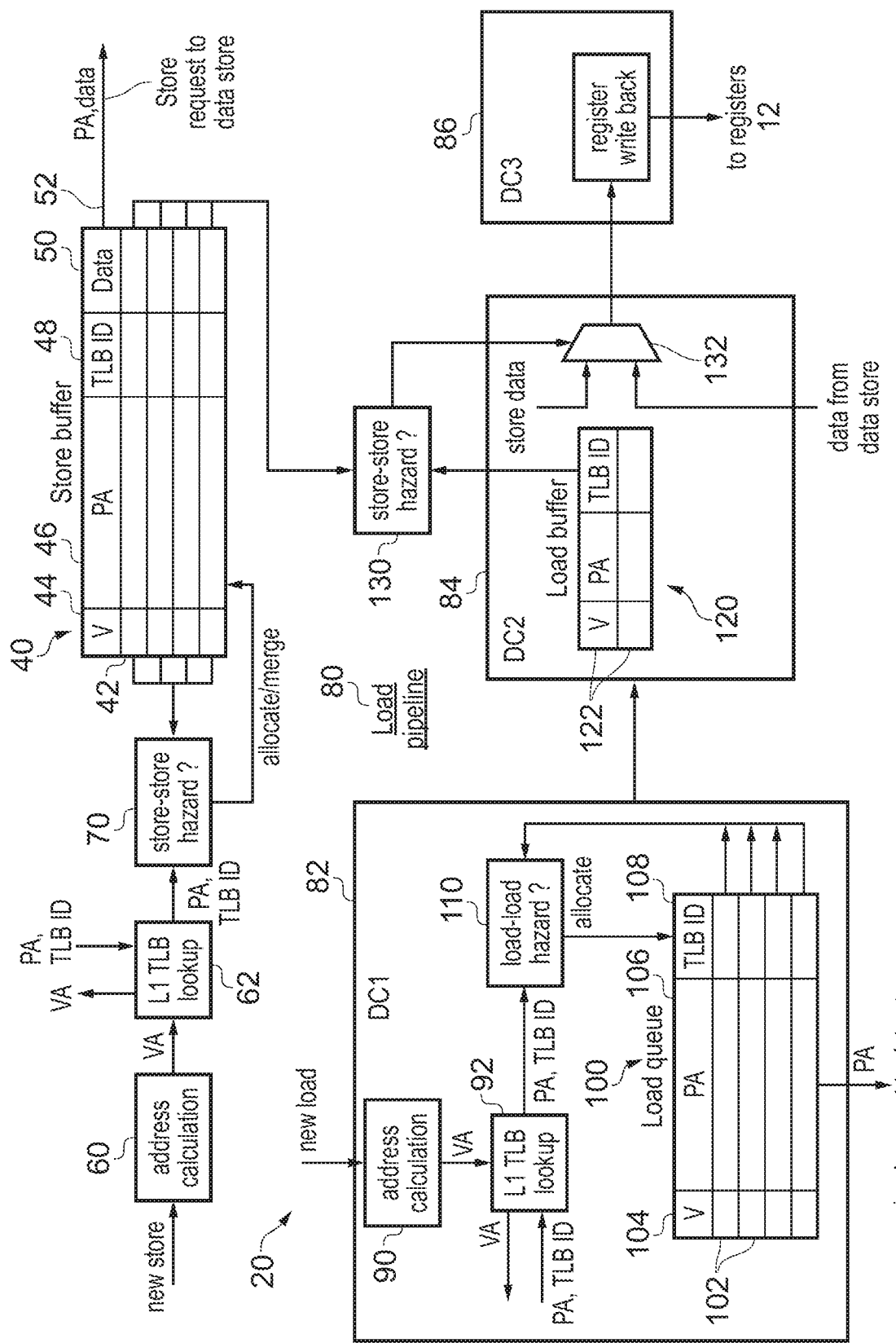
FIG. 2 shows an example of transaction queues for queueing pending data access transactions and hazard checking circuitry for detecting hazard conditions between two pending transactions.

FIG. 2 shows in more detail an example of circuitry provided within the load store unit 20 for processing load or store transactions triggered by corresponding load or store instructions.

The load/store unit 20 includes a store buffer 40 including a number of store slots 42 for tracking pending store transactions. Each store slot 42 includes a valid bit 44 indicating whether the store transaction indicated in that slot is valid, a physical address 46 of the corresponding store transaction, a TLB identifier (TLB ID) 48 identifying the TLB entry 36 of the L1 TLB 32 corresponding to the store transaction, and some data 50 to be stored to the data store 22 in response to that store transaction. It will be appreciated that other information could also be stored for each store transaction. When bandwidth is available for carrying out a store to the data store 22 then a pending store transaction from the store buffer 48 is selected and a store request 52 for writing the store data 50 to the data store 22 is issued to the data store 22.

As shown in FIG. 2, when a new store transaction is received (in response to a store instruction executed at the execute stage 14) the new store is provided to an address calculating unit 60 which calculates the virtual address for the store. For example a store instruction may specify a base register in the register bank 12 and an offset value and the address calculation circuitry 60 may add the offset to a base address stored in the register 12. The offset could be specified as an immediate value by the store instruction or with reference to another register. In some addresses following the address calculation the address calculating circuitry 60 may update the base register based on the newly calculated virtual address, while in other cases the base register may be preserved so that a subsequent instruction referring to the same base register will use the same base address as the current instruction.

The address calculating unit 60 outputs the virtual address (VA) for the store to a TLB lookup circuit 62 which issues a request to the TLB 30 to look up a corresponding physical address (PA) for the specified virtual address. As well as an indication of the PA (or at least the page portion of the PA), the TLB 30 returns the TLB identifier (TLB ID) identifying which of the TLB entries 36 of the L1 TLB 32 matched the specified virtual address. If the L1 TLB 32 did not already store the required TLB entry then there may be some delay while the entry is fetched from the L2 TLB 34 or from main memory 38 before the physical address and TLB can be returned.

The returned physical address and TLB ID are provided to store-to-store hazard checking circuitry 70 for checking whether the new store transaction hazards against any of the existing store transactions in the store buffer 40. The store-to-store hazard checking circuitry 70 performs hazard checking between the new store transaction and any pending store transaction in a valid transaction slot 42 of the store buffer. For each valid pending transaction, the store-to-store hazard checking circuitry 70 detects a hazard if the TLB ID 48 in that transaction slot 42 matches the TLB ID returned by the TLB 30 for the new store transaction, and also an offset portion of the physical address 46 in the corresponding transaction slot 42 matches an offset portion of the physical address (PA) provided for the new store transaction. The offset portion is a portion of the physical address which is mapped directly from a corresponding portion of the virtual address (as opposed to a page address portion which is translated from a virtual page address portion by the TLB).

Typically the offset portion is relatively small (e.g. 12 bits for a 4 KB page size), while the page address portion of the physical address is relatively large (e.g. it may be of the order of 30 to 40 bits). On the other hand, the TLB ID may be relatively small. For example a typical TLB may have 32 entries and so the TLB ID may only have 5 bits. Therefore, by comparing the L1 TLB ID in place of the page address portion of the physical address, this can reduce the size of the comparators in the hazard checking circuitry 70 from around 40 bits to 17 bits for instance, which greatly reduces the overhead of the hazard checking circuitry 70.

When the store-to-store hazard checking circuitry 70 detects a hazard condition, then it may respond in various ways. In some systems a new store which hazards against an existing store may simply be allocated to the store buffer, but some ordering bits may be set for the respective hazarding stores to ensure that the hazarding stores are carried out in their original order so that after all the stores are finished then the data in the corresponding data store 22 will have the correct value. Other systems may improve performance by merging successive store transactions to the same address so that only one store request needs to be sent to the data store to write the same value to the data store which would result if two or more successive hazarding stores were performed one after the other. Hence, there may be different responses to detection of a hazard condition. If no hazard is detected then the new store may simply be allocated to an invalid entry of the store buffer 40.

FIG. 2 also shows a portion of a load pipeline 80 for handling pending load transactions performed in response to load instructions. In this example the load pipeline includes three pipeline stages 82, 84, 86. New load transactions are input to the first load pipeline stage 82 and again address calculating circuitry 90 is provided to calculate the virtual address for the load transaction. The virtual address may be calculated in a similar way to the address of the store transaction discussed above. The generated virtual address is provided to TLB lookup circuitry 92 which supplies the virtual address to the TLB 30 and receives in return the physical address translated from the virtual address and the TLB ID identifying which entry 36 of the L1 TLB 32 matched the virtual address.

The first load pipeline stage 82 includes a load queue 100 for queueing pending load transactions which are awaiting issuing of a load request to the data store. The load queue 100 includes a number of transaction slots 102 which identify pending loads. Each transaction slot 102 in this example includes a valid bit 104 identifying whether the corresponding slot contains a valid load transaction, the physical address 106 for that load and a TLB ID 108 of the matching TLB entry for the load.

The first load pipeline stage 82 includes load-to-load hazard detection circuitry 110 for detecting whether the incoming load corresponds to the same physical address as one of the existing loads pending in the load queue 100. Again, the load-to-load hazarding circuitry detects the hazard condition when the offset portions of the new and existing physical address match and also the TLB IDs for the new and existing loads match. This is done for each valid entry of the load queue 100 and if any hazard is raised then there are various actions which can be taken. For example, ordering information may be set to track the order in which successive loads to the same address are performed to ensure the correct results, or successive loads to the same address could be merged. Based on the hazard detection, the new load is allocated into an invalid entry of the load queue 100. When there is sufficient bandwidth for issuing a load request to the data store 22 then one of entries of the load queue 100 is selected and load request is triggered using the corresponding physical address.

When a load transaction is selected and a corresponding load request is issued to the data store, then that transaction passes to the second load pipeline stage 84 where the transaction is placed in a load buffer 120 which includes a number of slots 122 which again include a valid bit, the physical address and the TLB ID. The transactions remain in the load buffer 120 while awaiting return of the corresponding data from the data store. Store-to-load hazarding circuitry 130 is provided for detecting whether any hazard conditions occur between store transactions pending in the store buffer 40 and load transactions pending in the load buffer 120. Again, the hazards are detected by comparing the respective offset portions of the physical addresses and the TLB IDs of the respective store and load transactions in a similar way to the other hazard checking circuitry 70, 110 described above. If a hazard is detected then it is not necessary to wait for the data to be returned from the data store as the load can be serviced using the store data 50 from the store buffer 40 for the corresponding hazarding store. On the other hand, if no hazard is detected for a given load, the second load pipeline stage 84 awaits the return of the data from the data store. A multiplexer 132 for example selects between data from the store buffer 40 and the data from the data store 22 and outputs the appropriate data as the result of the load.

The third load pipeline stage 36 receives the data which is the result of the load and controls the data to be written back to one of the registers 12. It will be appreciated that FIG. 2 shows a particular example of a load/store pipeline 20 and other architectures can be used.

Figure 3:
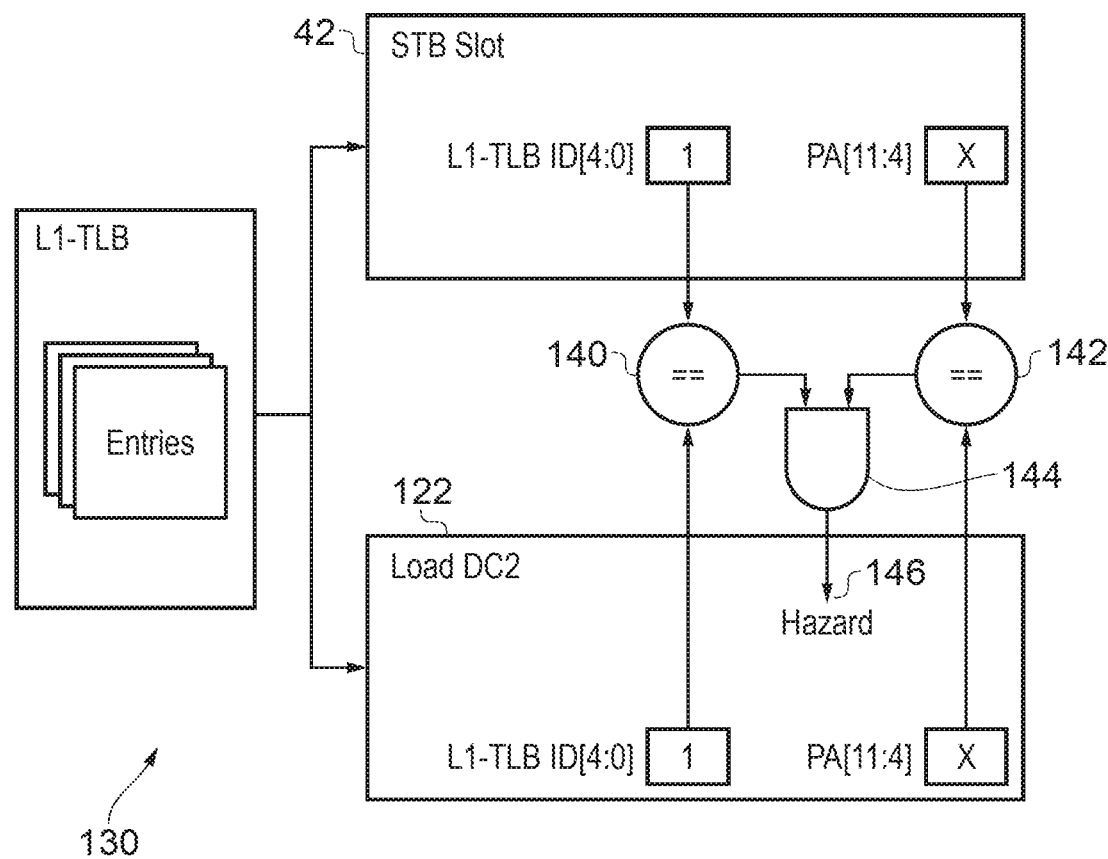
FIG. 3 shows an example of the hazard checking circuitry.

FIG. 3 shows an example of the store-to-load hazard checking circuitry 130 for detecting hazards between a store transaction in a transaction slot 42 of the store buffer 40 and a load transaction in transaction slot 122 of the load buffer 120. A shown in FIG. 3, the hazard checking circuitry 130 includes a TLB entry identifier comparator 140 for comparing the TLB IDs of the corresponding transactions in the store buffer slot 42 and the load buffer slot 122, and an offset comparator 142 for comparing the offset portions of the physical addresses in the corresponding slots 42, 122. In this example the offset portion of the addresses comprises bits [11:4] of the physical address, but in other systems using other page sizes, different sized address offsets can be compared. AND gate 144 receives the output of the two comparators 140, 142 and asserts a hazard signal 146 if both of the compactors 140, 142 do detect a match. If the hazard signal 146 is asserted then this indicates that there is a hazard condition since the transaction in the respective slots 42, 122 relate to the same physical address. On the other hand, if either the TLB IDs do not match or the offsets do not match, the transactions relate to different physical addresses and no hazard is signalled. When the hazard condition is detected, then the response may for example be that the store data is forwarded as the result of the load.

The other hazard checking circuitry 70, 110 may operate in a corresponding way to the hazard checking circuitry 130 shown in FIG. 3, with the only difference being the type of transactions being compared and the particular response taken when a hazard is detected.

While FIG. 3 shows a comparison between a particular pair of transactions, it will be appreciated that this may be repeated for each pair of corresponding transactions to be hazarded. For example, a bank of comparators 140, 142 may be provided with each set of comparators comparing the TLB IDs and offsets for a respective pair of transactions. Hence, by reducing the size of each comparator by using the TLB ID in place of the upper bits of the physical address, the overall size of the hazard checking logic can be greatly reduced.

As mentioned above, when a virtual address misses in the L1 TLB 32 then this may required a new entry to be fetched from the L2 TLB 34 or from page tables in memory. When the new TLB entry is received, it can be allocated to the L1 TLB 32, but if all the entries of the L1 TLB 32 already contain valid TLB entries then one of the existing entries may need to be invalidated. If a given entry of a TLB is invalidated before a corresponding load or store transaction specifying that entry with its TLB ID is complete, then this could lead to one of the hazard checking circuits 70, 110, 130 detecting a hazard due to matching TLB IDs between a new transaction and an existing transaction when in fact these transactions relate to the different addresses. To ensure that a pair of transactions with matching TLB IDs relate to the same physical page, the TLB 30 may prevent an entry being invalidated until there are no more outstanding transactions which corresponding to that entry which have not yet progressed beyond the last point at which hazards are detected using the TLB IDs. That is, the TLB may prevent invalidation or reallocation of a given TLB entry until any data access transaction specifying that entry using its TLB ID has progressed beyond the last stage of hazard checking. In FIG. 2, this could be when the transaction has progressed beyond the store buffer 40 or the load buffer 120.

Figure 4:
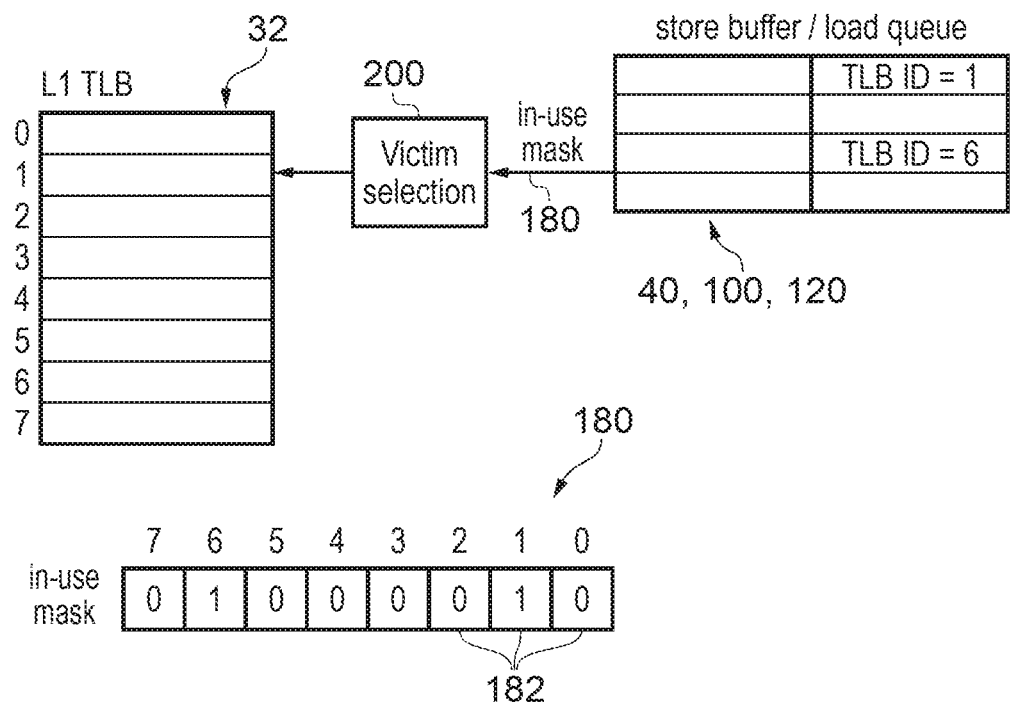
FIG. 4 shows an example of a victim selection policy for a translation lookaside buffer (TLB) which prevents TLB entries corresponding to pending transactions being evicted.

FIG. 4 shows one example of ensuring that TLB entries are locked in place to remain valid for as long as corresponding transactions are inflight, but it will be appreciated that other techniques could also be used. As shown in FIG. 4, each transaction queue for queueing transactions to be hazarded (e.g. the store buffer 40, the load queue 100 and the load buffer 120) may provide an in-use mask 180 to the TLB 30. As shown at the bottom of FIG. 4 the in-use mask 180 may comprise a series of bits 182, each corresponding to one of the transaction slots of the corresponding transaction queue 40, 100, 120. Each time a new transaction is allocated to the transaction queue 40, 100, 120, the queue asserts the bit 182 of the in-use mask which corresponds to the TLB entry specified by the TLB ID for that transaction. When a transaction leaves the queue, the queue clears the corresponding bit selected depending on the TLB ID of that transaction. Hence, the in-use mask 180 indicates the TLB which TLB entries need to be reserved.

A victim selection circuit 200 of the TLB 32 may prevent any in-use entries indicated by any of the in use masks 180 from the respective queues 40, 100, 120 being selected as victim entries to be invalidated and replaced with a new entry. Typically, the L1 TLB may include a greater number of entries than there are transaction slots in the respective queues 40, 100, 120, so a victim entry can always be allocated. The victim selection circuitry 200 may select the victim using any known algorithm, e.g. round robin or random, from among all the entries which are not indicated by any of the in-use masks 180 as currently being in use. This prevents translations with transactions in flight being victimised, and also as a side effect will result in a pseudo least recently used replacement policy without needing to use any additional hardware for tracking which entries are the least recently used.

Also, sometimes it may be required to flush the L1 TLB to invalidate all its entries. For example, when software (e.g. an operating system) updates the page tables in the main memory 28 it may trigger invalidation of all the TLBs 32, 34 to ensure that out of date translation data does not continue to be used. However, to allow the hazard checking circuitry to continue to validly compare TLB IDs, if the L1 TLB is flushed, any entries currently indicated as in using the mask 180 may remain valid for a time so that they cannot be invalidated or victimised until the corresponding transactions in the transaction queue 40, 100, 120 are retired. Nevertheless, during this time no new transaction may hit against these entries. For example, each TLB entry may have corresponding state indicator indicating whether the entry is valid, invalid or in the state where the entry remains valid and cannot be victimised but no new transaction can hit against the entry.

Some architectures may allow aliasing of TLB entries where two different virtual addresses may be mapped to the same physical addresses. If aliasing is present, then two transactions to the same physical address could have different L1 TLB IDs and so this could potentially lead to hazard situations being missed. In systems compliant with an architecture that does not allow aliasing then this problem does not arise and so no alias detection circuitry is necessary.

Figure 5:
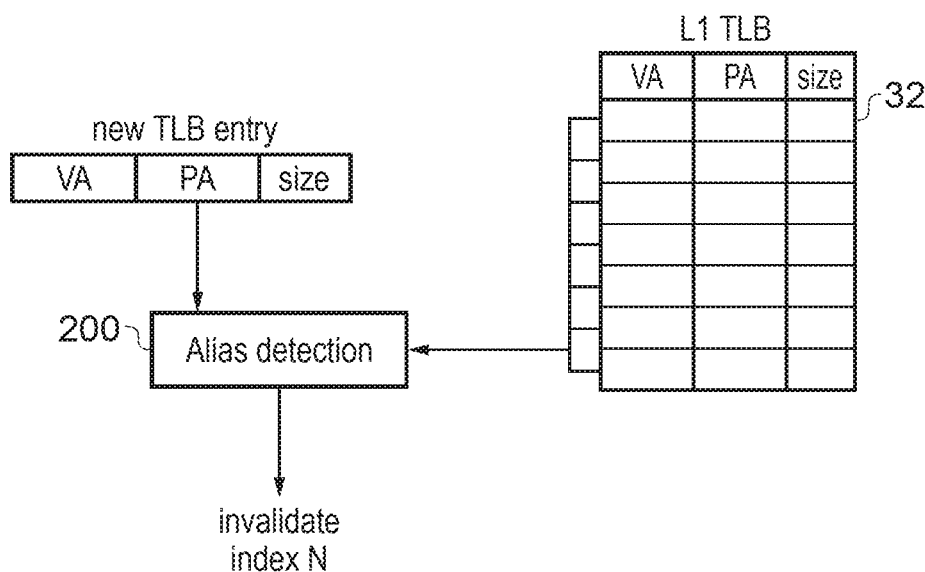
FIG. 5 shows an example of alias detection for detecting when a new TLB entry to be allocated to the TLB corresponds to the same physical address has an existing entry.

However, if it is desirable to support an architecture which allows aliasing, then as shown in FIG. 5 alias detection circuitry 202 may be provided to detect when the physical address of a new TLB entry to be allocated to the TLB is the same as the physical address of an existing entry within the L1 TLB 32. When the alias condition is detected by the alias detection circuitry 202 then this can be handled in different ways. A simple approach can simply be to invalidate the existing the L1 TLB entry that corresponds to the same physical address as the new TLB entry. This ensures that there can only be one entry in the L1 TLB 32 for any given physical address, and so if any of the hazard checking circuits 70, 110, 130 detect different TLB IDs for a pair of transactions it is known that they relate to different physical addresses and so no hazard is detected. If the invalidated TLB entry relates to an in-flight transaction (e.g. that entry is indicated as "in-use" by the in-use mask as in FIG. 4), then the invalidation of this entry may wait until that transaction retires and so the later transaction which requires the new TLB entry to be allocated may also be delayed. Hence, it may take some cycles to deal with the aliasing issue. However, in practice aliasing is generally rare and so this penalty may not be encountered often.

In systems which support out-of-order processing, it is possible that when an alias occurs, a deadlock could arise when an older transaction requiring the new TLB entry to be allocated is waiting for an alias to be cleared by invalidating another entry, but the alias cannot clear until a younger transaction has completed, and the younger transaction cannot complete because it is dependent on the older transaction awaiting allocation of the new TLB entry. To address this issue, when an alias is detected between the new TLB entry and an existing TLB entry, the load/store unit 20 may detect whether there is at least one instruction which requires the existing TLB entry which is dependent on the instruction requiring the new TLB entry, and if so then that at least one instruction may be flushed from the pipeline and reissued later. In some cases the system may provide a more coarse grained flushing technique where for example all instructions which are younger than the instruction requiring the new TLB entry are flushed. In this way such deadlocks can be avoided. As aliasing may itself be rare, and even when aliasing occurs the deadlock condition may also be rare, then such deadlocks would be very rare and so the overhead of occasionally flushing more instructions than required may be justified given the simpler logic for triggering the flush if it is not necessary to identify the particular younger instruction that is dependent on the older instruction. Such deadlocks would not arise in an in-order processor, and so in this case the alias detection circuitry 202 may not need to trigger any flushing when aliasing is detected.

Another way of handling the aliasing may be to allow a certain number of TLB entries with aliased physical address to reside within the L1 TLB, but to keep a record of which L1 TLB identifiers correspond to the same physical address, and then the hazard checking circuitry 70, 110, 130 may have some additional logic to determine that a hazard condition is detected when two transactions specify a pair of different TLB IDs which have previously been identified as aliasing. However, in many cases aliasing may be sufficiently rare so that this extra logic may not be justified and it may be simpler just to invalidate an entry of the TLB when aliasing is detected.

In some cases, the TLB may support entries 36 corresponding to different page sizes. For example, each entry could correspond to a 4 KB page, 16 KB page, or 64 KB page with a size indicator identifying a page size for that entry. When looking up the TLB 30, and when detecting aliases as in FIG. 5, the page size may therefore need to be considered in order to determine which portions of the address should be compared.

Figure 6:
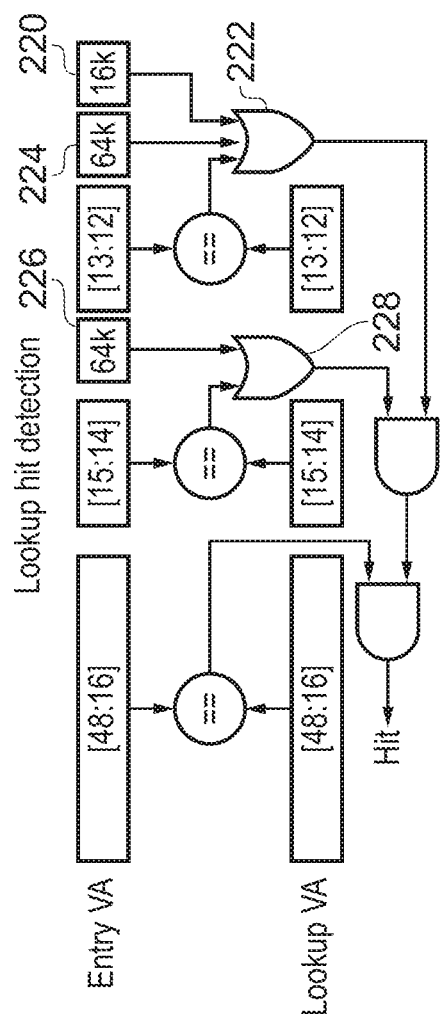
FIG. 6 shows an example of circuitry for looking up whether a specified virtual address hits against an entry of the TLB.

FIG. 6 shows an example of the circuitry for looking up the TLB for a new store or load. The upper portion of FIG. 6 shows bits [48:12] of a virtual address of an existing entry in the TLB and the lower portion shows the corresponding bits [48:12] of a virtual address to be compared against each entry to determine whether its hits in the TLB (in this example bits [11:0] of the address would be the offset portion which is mapped unchanged between the virtual and physical addresses). The comparison shown in FIG. 6 may be repeated for each TLB entry 36 of the L1 TLB 32. Bits [48:16] of the corresponding addresses are compared and affect the outcome of whether or not a hit is detected, regardless of whether the page size is 4, 16 or 64 KB. When the page size is 4 KB, then bits [15:14] and [13:12] of the addresses are also compared and a network of OR and AND gates ensures the hit signal is only generated if all of the bits [48:12] of the stored virtual address in the TLB match the corresponding bits of the looked up virtual address. When the page size is 16 KB, then a flag 220 is set to 1 and provided to OR gate 222 so that the output of OR gate 222 is always 1 regardless of whether bits [13:12] of the compared addresses match. This means that the hit signal will be generated if bits [48:14] match in the respective addresses but the hit signal does not depend on bits [13:12]. Similarly, when the page size is 64 KB then flags 224, 226 are set to 1 to ensure that the outputs of OR gates 222, 228 are always 1, so that comparisons of bits [15:12] do not affect the hit result. Hence, this allows the TLB to be looked up across multiple page sizes.

Figure 7:
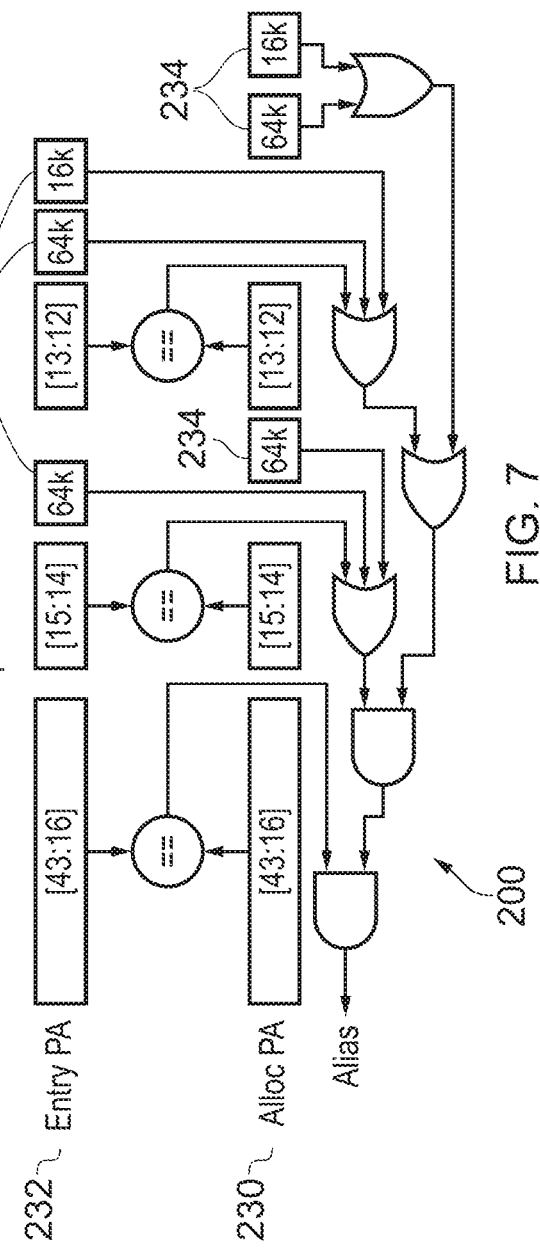
FIG. 7 shows an example of alias detection circuitry supporting multiple page sizes.

FIG. 7 similarly shows an example of the alias detection logic 202 for detecting whether a physical address 230 of a new entry to be allocated to the L1 TLB 32 matches the physical address 232 of any existing entry within the TLB. Again, this comparison can be repeated for each entry of the L1 TLB 32. By asserting various flags 234 when the page size is 16 KB or 64 B, the comparisons of the lower bits [15:14] and/or [13:12] can be masked depending on the page size, to ensure that the alias is only detected if the pages represented by the new and existing entries overlap. Unlike in FIG. 6, it is not only the existing physical address 232 that may be partially masked depending on the page size, but also the physical address 230 associated with the new entry for which the alias is to be detected.

Figure 8:
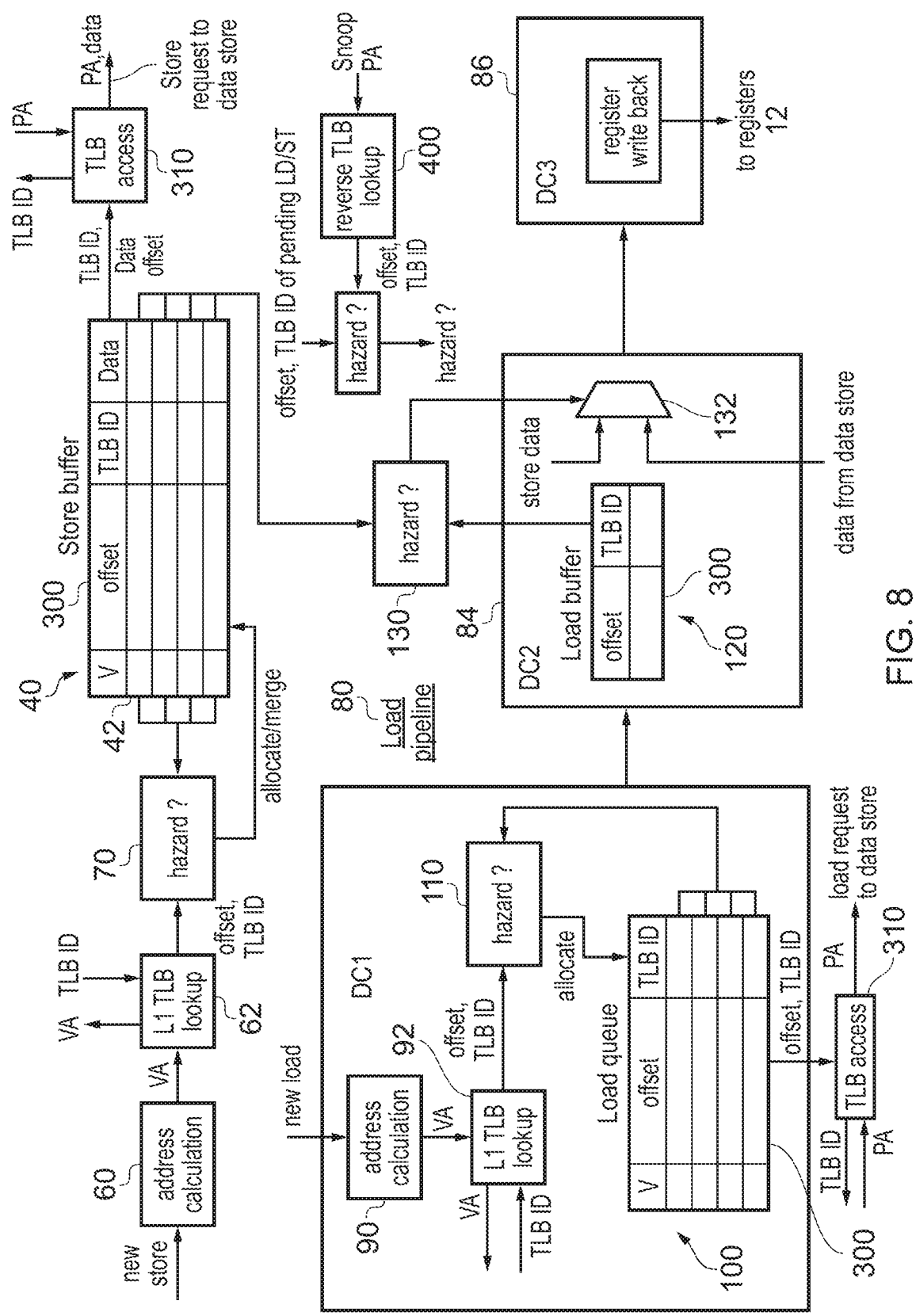
FIG. 8 shows another example in which the transaction queues store an offset portion of the address of each transaction.

In the example of FIG. 2, each transaction queue stores the full physical address 46, 106 for each pending transaction. However, as shown in FIG. 8 it is also possible to provide an implementation which avoids storing the full physical address anywhere within the load/store unit 20. The circuitry shown in FIG. 8 is generally the same as that of FIG. 2 and so unless otherwise specified it functions in the same way as FIG. 2. Unlike in FIG. 2, when the TLB 30 is looked up at stage 62 of the store pipeline or stage 92 of the load pipeline, rather than returning the full physical address the TLB 30 only returns the TLB ID and then the address offset of the new store or load instruction is provided together with TLB ID to the hazard checking circuitry 70, 110 for hazard checking. Instead of storing the full physical address 46, only the offset portion 300 is stored in the transaction queues 40, 100, 120. The hazard checking circuitry 70, 110, 130 can function in the same way as FIG. 2 since it simply compares the offsets and TLB IDs of respective transactions. However, in this embodiment the storage circuitry required in each transaction queue 40, 100, 120 can be made more efficient since it requires fewer bits for each transaction slot to store the offset instead of the full physical address. However, in this case then when a store or load request is issued to the data store, then an additional TLB access stage 310 is provided to index into the entry of the L1 TLB 32 specified by the TLB ID of the transaction, and when the TLB 30 then returns the required physical address this is combined with the address offset for the transaction to form the physical address which is sent to the data store. Hence, there may be an additional small delay in handling the store or load request, but this approach makes the transaction queues more efficient in terms of circuit area and power consumption.

With the approach shown in FIG. 8, there may be some physically addressed transactions which may need to be hazarded against transactions within one or more of the transaction queues 40, 100, 120. For example, in a multi processor system, another processor within the system may have its own cache which may cache data from a common memory also accessed by the caches of the data store 22. In this case to maintain coherency between the different cached versions of the data, coherency mechanisms may be provided which may for example include one processor sending a snoop transaction to another to determine whether data from a given physical address is cached within the cache of the other processor. The processor receiving the snoop may need to identify whether there are any pending loads or stores to that address and so may perform hazarding of the snoop transaction against each pending load and store. Since the snoop transaction is physically addressed, in the embodiment of FIG. 8 where the load or store buffers or queues do not contain the physical address, then an additional reverse TLB look up stage 400 is provided to search through each entry of the L1 TLB to check whether the physical address specified by the snoop is present, and when one of these TLB entries matches the page address portion of the snoop physical address, then the corresponding TLB ID is returned and this together with the offset can be hazarded against the TLB ID and offset of pending loads and stores to determine whether there is a hazard between the snoop and the load or store. If the L1 TLB 32 does not contain an entry for the physical address of the snoop, it can be determined that there is no hazard without any comparison with the contents of the transaction queues 40, 100, 120, because if there was a pending transaction corresponding to the snooped physical address then the mechanism describes with respect to FIG. 4 would have locked down the corresponding TLB entry to ensure there is an entry with the snooped physical address in the L1 TLB 32. This technique of performing a reverse TLB lookup can be performed for any physically addressed transaction which needs to be hazarded against one of the transactions stored in the transactions queues 40, 100, 120 (not just snoop transactions).

In contrast, in the embodiment of FIG. 2 hazarding of snoop transactions or other physically addressed transactions would be simpler since the physical address can simply be compared against the physical address stored in the transaction queues 40, 100, 120 for pending loads or stores.

Figure 9:
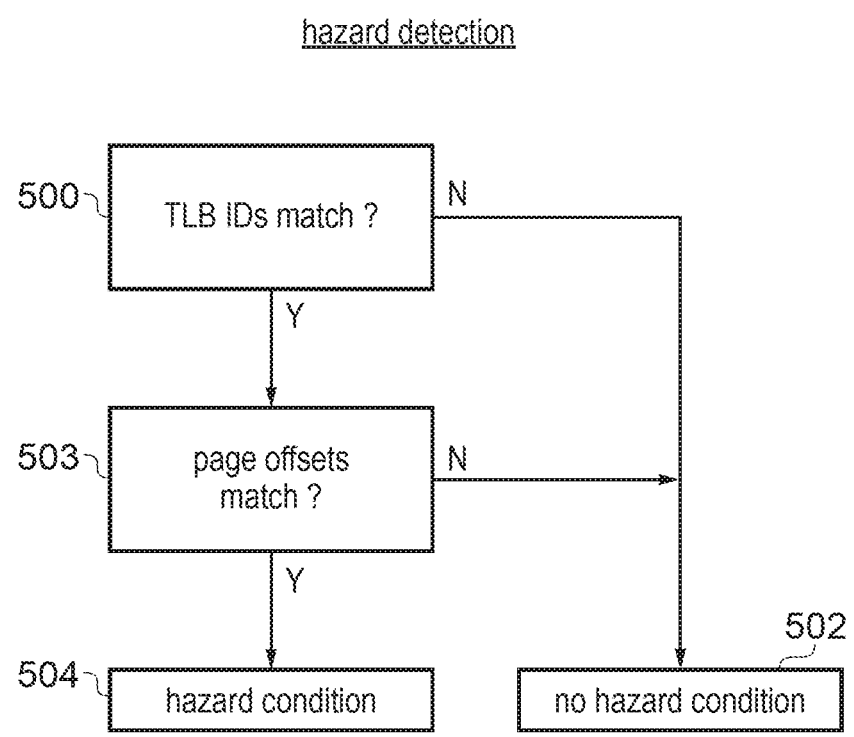
FIG. 9 shows a method of hazard detection.

FIG. 9 shows a flow diagram illustrating a method of detecting hazards between a pair of transactions. At step 500 it is determined whether the TLB identifiers identifying the corresponding L1 TLB entries for the pair of transactions match. As mentioned above this would generally be the case if the TLB IDs of the respective transactions are the same, although in the case where aliasing is allowed within the TLB then TLB IDs may also be considered to match if they correspond to an aliased pair of TLB entries which map to the same physical address. If there is no match between the TLB IDs then at step 502 no hazard condition is detected. On the other hand, if the TLB IDs match then at step 503 the page offsets of the respective addresses corresponding to the two transactions are compared, and if there is match then at step 504 a hazard condition is detected while if the page offsets do not match then at step 502 no hazard condition is detected.

While FIG. 9 shows the method as a sequential series of steps, it will be appreciated that some steps could be performed in a different order or in parallel with other steps. For example, the comparisons of the TLB IDs and the offsets could be performed in the opposite order to the order shown in FIG. 9, or in parallel.

While the example of FIG. 2 above shows a particular embodiment in which hazard checking is performed for transactions at certain points of the load/store unit 20, more generally the method of FIG. 9 may be applied to any system using virtual-to-physical address translation where it is required to determine whether a pair of data access transactions correspond to the same physical address.

Figure 10:
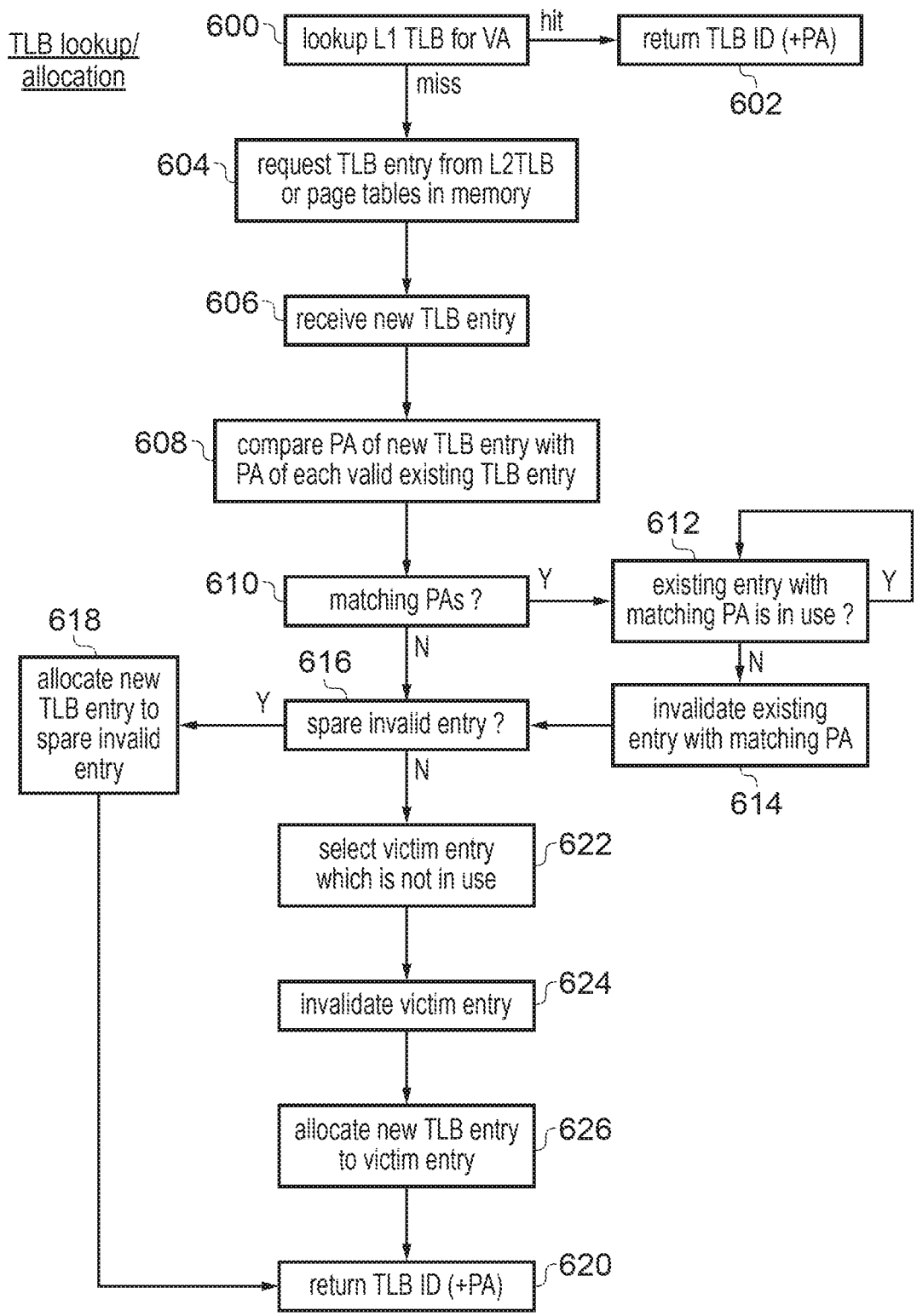
FIG. 10 shows an example of looking up a TLB and allocating entries.

FIG. 10 shows a flow diagram illustrating a method for managing lookups and allocations of entries to the TLB. At step 600, the virtual address (or at least the page address portion of the virtual address) for a new load or store transaction is provided to the TLB which performs a lookup to identify whether any of its entries matches the virtual address. If there is match then the virtual address hits in the L1 TLB and at step the 602 the TLB ID identifying the matching TLB entry is returned to the load store unit. Optionally, the physical address (or at least the physical page address portion of the physical address) is returned as well, although as shown in FIG. 8 this is not essential.

On the other hand, if there is a miss in the L1 TLB 32 then at step 604 the required TLB entry for the specified virtual address is requested from the L2 TLB or from page tables in memory 28 depending on whether the L2 TLB 34 already includes the required entry. A page table walk to memory is performed if necessary and this may be relatively slow if several levels of page table need to be traversed to find the required entry. Eventually, the new TLB entry is received at step 606. At step 608 the alias detection logic 202 compares the physical address of the new TLB entry with a physical address of each valid existing TLB entry in the L1 TLB 32. At step 610 the alias detection circuitry determines whether the compared physical addresses match. If so, the valid existing TLB entry with the matching physical address need to be invalidated.

At step 612 the alias detection logic or the victim selection logic determines whether the existing entry which has the matching physical address is currently in use depending on the information 180 provided from the various transaction queues in the load store unit. If the existing entry to be invalidated is currently in use because there is an in-flight transaction corresponding to it, then the entry cannot be invalidated yet and the method remains at step 612 until that transaction is no longer pending and the transaction queue no longer indicates the entry as in use. At this point then at step 614 the existing entry with the matching physical address is invalidated and then the method proceeds to step 616. Or on the other hand, if at step 610 no matching physical addresses were detected for the new TLB entry then steps 612 and 614 can be omitted. At step 616 it is determined whether there is a spare invalid entry in the L1 TLB 32. If so then at step 618 the new TLB entry received from the L2 TLB 34 or memory is allocated into the spare invalid entry and at step 620 the TLB ID of that allocated entry is returned, and optionally the physical address may also be returned as discussed above.

On the other hand, if at step 616 it is determined that there are no spare invalid entries to accommodate the new TLB entry, then at step 622 the victim selection logic 200 selects a victim entry which is not indicated as in use by the in use mask 180 received from the transaction queue 4, 100, 120. The victim entry could be selected using any known algorithm such as round robin or random, as long as the victim selection policy excludes any in use entries for which there are corresponding transactions in flight. At step 624 the selected victim entry is invalidated and at step 626 the new TLB entry is then allocated to the selected victim entry and at step 620 the TLB ID is then returned.

In this way, allocations to the TLB can be managed to ensure that when hazard checking circuitry detects a matching pair of TLB IDs then this implies that the corresponding physical addresses also match, while when two TLB IDs are different then this implies that the corresponding physical addresses are different.

In the above examples, a TLB ID is used as a proxy identifier for a data access operation to be processed by the data access circuitry. The proxy identifier has fewer bits than a physical address corresponding to the virtual address specified by the data access operation. At least one buffer (e.g. the load queue 106, load buffer 120 or store buffer 40) may buffer information (including the proxy identifier) for one or more pending data access operations. By storing the proxy identifier for the data access operations in the buffer instead of the physical address, storage capacity of the buffers can be reduced to save circuit area and power consumption. Address translation circuitry (e.g. the TLB) may look up the physical address corresponding to the virtual address specified for a data access operation after that data access operation has progressed beyond the at least one buffer (e.g. see FIG. 8 where the TLB access 310 occurs after the load queue 100 or store buffer 300). This can be beneficial as it means that data access operations which do not progress beyond the buffer (e.g. due to being cancelled or merged with another operation) do not require a physical address lookup.

Checking circuitry (e.g. the hazard checking circuitry 110, 70, 130) may identify whether at least two pending data access operations correspond to the same physical address, in dependence on a comparison of the proxy identifiers determined for said at least two pending data access operations. By comparing the proxy identifiers for the data access operations instead of their physical addresses, the number of bits required for a comparator within the checking circuitry can be reduced, reducing circuit area and power consumption.

The comparison performed by the checking circuitry could be for a number of purposes, e.g. any of the load-to-load, store-to-store or load-to-store hazard checking described above.

When the checking circuitry detects that at least two pending data access operations correspond to the same physical address, and the least two pending data access operations are store operations of the same software thread, the checking circuitry may trigger merging of the at least two store operations to form a combined store operation. In this case, the address translation circuitry may determine the physical address for the combined store operation after the two or more store operations have been merged. This means only one physical lookup of a TLB for a physical address may be needed, rather than multiple physical address lookups for each individual store which would be the case if the physical address lookup occurred before the merging. This saves TLB lookup bandwidth which can be used for other operations.

Proxy identifier storage circuitry may be provided comprising a number of entries each corresponding to a block of virtual addresses. Proxy identifier lookup circuitry may determine the proxy identifier for a given data access operation in dependence on which entry corresponds to a block of virtual addresses including the virtual address specified by the given data access operation. In some examples the proxy identifier could be constructed based on an index of the entry of the proxy identifier storage circuitry which matches the virtual address of a given data access operation. However, in other examples each entry of the proxy identifier storage circuitry may actually store at least part of the proxy identifier to be used for data access operations specifying a virtual address in the corresponding block of virtual addresses. In some cases the proxy identifier may also be generated based on one or more bits of the virtual address for the data access operation (e.g. to distinguish the different virtual addresses which each map to the same block of addresses corresponding to one entry of the proxy identifier storage circuitry).

In some examples, the proxy identifier storage circuitry may be the TLB itself, so that each entry of the TLB/proxy identifier storage specifies both the proxy identifier and address mapping data used to determine the physical address corresponding to the virtual address. However, the proxy identifier storage circuitry could also be a separate structure from the TLB, which is looked up at an earlier stage of the load/store pipeline than the TLB.

The proxy identifier could be a TLB ID as in the examples above, which indicates which TLB entry corresponds to the data access operation. However, the proxy identifier can also be a value which may differ from the TLB ID of the corresponding TLB entry. This can be particularly useful for enabling aliasing of multiple virtual addresses onto the same physical address to be supported in the TLB. Also, using a proxy identifier other than the TLB ID can be useful as it means that proxy identifiers can continue to be used as a proxy for a physical address of a data access operation even if the data access operation does not have corresponding address translation data still held within the TLB (e.g. in an out-of-order processor, information on committed data access operations may continue to be held in a reorder buffer even if the corresponding TLB entry has already been evicted or overwritten).

The proxy identifier storage circuitry may support two or more entries specifying the same proxy identifier for two or more different blocks of virtual addresses. Hence, it is not essential to ensure that on allocation of a new entry to the TLB, any existing entry corresponding to the same physical address is evicted as discussed in the above examples. Instead, multiple aliased entries may be retained in the TLB, and the same proxy identifier can be used for data access operations which use either aliased address mapping. This can help improve performance by avoiding the need for early evictions of TLB entries.

Hence, alias control circuitry may be provided to detect an alias condition when a new entry to be allocated to the proxy identifier storage circuitry is an aliased entry corresponding to a block of virtual addresses mapping to the same block of physical addresses as a block of virtual addresses corresponding to an existing entry of the proxy identifier storage circuitry. For example, the alias control circuitry may comprise the circuitry shown in FIG. 7 (which may compare the physical addresses of existing entries with a physical address to be allocated, considering multiple different page sizes).

When allocating a new entry corresponding to a block of virtual addresses which is different to each block of virtual addresses corresponding to an existing valid entry of the proxy identifier storage circuitry, the alias control circuitry may set the proxy identifier stored in the new entry based on an entry identifier identifying the location of the new entry within the proxy identifier storage circuitry. Hence, when no alias is detected, the proxy identifier may simply correspond to the index of the entry to which the new entry is allocated (e.g. if the proxy identifier storage circuitry is the TLB itself, for non-aliased allocations the stored part of the proxy identifier may be the same as the TLB ID discussed above).

On the other hand, if the alias condition is detected (when the newly allocated block maps to the same block of physical addresses as an existing entry), then the alias control circuitry may set the proxy identifier stored in the new entry to be equal to the proxy identifier stored in the existing entry. Hence, when an alias is detected, multiple entries which correspond to the same physical address can all be mapped to the same proxy identifier.

Following detection of the alias condition, the alias control circuitry may prevent the existing entry being deallocated from the proxy identifier storage circuitry when there is at least one valid aliased entry of the proxy identifier storage circuitry which maps to the same block of physical addresses as the existing entry. This ensures that the proxy identifier used for the set of two or more aliased entries can be trusted to represent the same physical address (otherwise if the master entry could be reallocated to a different data access operation before all the subsequent aliased entries have been invalidated, there could be a risk of multiple data access operations pending in the pipeline using the same proxy identifier but mapping to different physical addresses). Hence, this allows aliased VA-to-PA mappings to be supported while still using the proxy identifier scheme to save storage capacity within buffers within the load/store processing circuitry.

Another benefit of using a proxy identifier which is not strictly dependent on the TLB ID is that this can allow the same proxy identifier to be used for data access operations from different software threads which correspond to the same physical address. Different software threads would often have different VA-to-PA mappings and so could be allocated separate TLB entries (e.g. distinguished by a different translation context identifier such as an address-space ID or virtual machine ID). However, by allowing the same proxy identifier to be used for such data access operations, this allows further savings in any circuitry which detects hazards or compares physical addresses of data access operations between different threads, as it would not be necessary to compare the actual physical addresses in order to detect inter-thread hazards—instead the shorter proxy IDs could be compared. Unlike data access operations for the same thread, the checking circuitry may prevent merging of at least two store operations from different software threads even when the at least two store operations correspond to the same physical address (merging of data across threads could give the wrong result).

Figure 11:
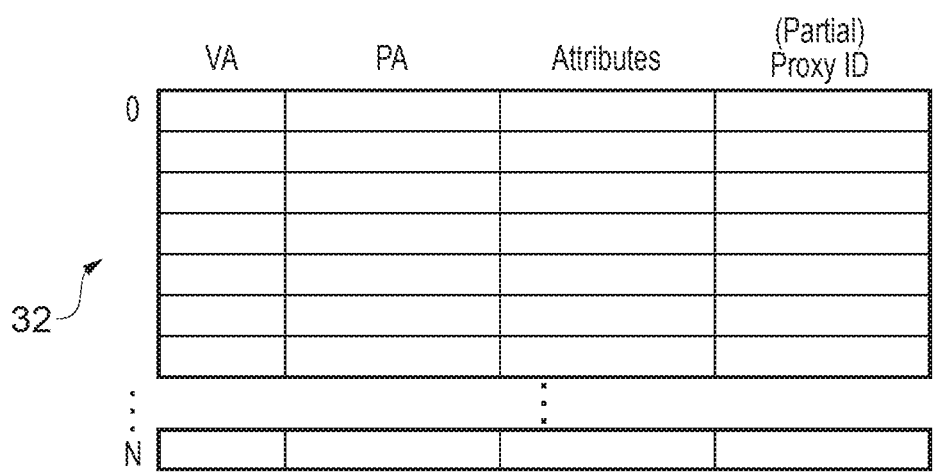
FIG. 11 shows an example of proxy identifier storage circuitry for storing proxy identifiers corresponding to virtual addresses (in this example the proxy identifier storage circuitry is shared with the TLB)

FIG. 11 shows an example of an L1 TLB 32 which can act as proxy identifier storage circuitry as discussed above. In addition to the virtual address tag and corresponding physical address and any other memory access attributes (e.g. translation context identifiers, access control parameters, etc.), each entry of the L1 TLB 32 may also store a portion of the proxy identifier (proxy ID) to be used for data access operations specifying that virtual address. As each TLB entry corresponds to a block of addresses, the actual proxy ID used for a data access operation may be formed by combining the stored portion of the proxy identifier with less significant page offset bits of the virtual address. Hence, rather than forming the TLB ID by encoding a value based on the index of the entry that hits for a given virtual address, the proxy ID for a given data access operation can be obtained by doing a Content-addressable memory (CAM) search for the virtual address of the data access operation in the TLB, and then multiplexing out the proxy ID stored in the entry that hits (and combining it with the lower offset bits of the virtual address). This puts the proxy ID encoder and TLB ID alias override logic on the allocation side of the TLB instead of post-translation-lookup at the time of translation, which further improves performance and power consumption as allocations to the TLB are less common than lookups and so the proxy ID encoding circuitry may not need to be activated as often. Although FIG. 11 shows an approach where the partial proxy ID is stored in the TLB, another approach could be to provide a separate structure mapping virtual addresses to proxy IDs.

One example of a technique for managing allocations to the TLB is as follows. When a page walk returns to the L1 TLB, a new TLB entry is allocated even if it aliases against the physical address of an existing entry (as detected by the alias logic shown in FIG. 7). If there is no alias against an existing L1 TLB entry, the proxy ID for the new entry is set based on the index of the newly allocated entry. Alternatively, an arbitrary value could be selected for the proxy ID as long as it is different from any previously allocated proxy ID for a valid TLB entry, but using the entry index is a simple and efficient way to implement this as it removes the need for additional circuitry tracking which proxy ID values are in use. On the other hand, if there is an alias against an existing entry, a new TLB entry is still allocated, but the proxy ID is set equal to the TLB ID of the first entry ("master entry") allocated for the same physical address. This allows multiple aliased entries to coexist in the L1 TLB where all entries return the same proxy ID for use as a proxy for a PA address match. Each entry can also include tracking information indicating whether a previously allocated alias exists, and if an entry is a "master entry" referred to by other aliased entries for the same PA. The TLB control logic ensures that a "master entry" remains resident until all aliased entries are removed.

In summary, VA->PA aliases can simultaneously exist in the same thread and both can be used concurrently using the same proxy ID. The proxy ID is saved for an entry in the TLB and multiplexed out and returned when performing the proxy ID generation. For non-aliased entries, the proxy ID represents the encoded ID (index) of that entry. For aliased entries, the proxy ID represents the encoded ID (index) of the "master entry". When a second VA maps to the same PA that is already in the L1 TLB, the first entry is marked as a "master entry" and is blocked from deallocation until it is no longer a master (all aliases are deallocated). A new aliased entry stores the proxy ID of its "master entry" instead of its own TLBID. The "master entry" is marked to prevent it from deallocating until all of its aliases are no longer used.

Figure 12:
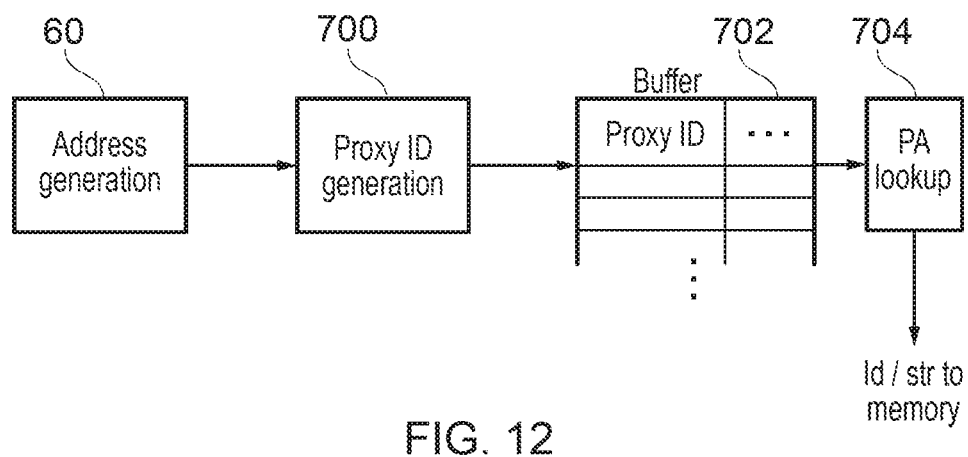
FIG. 12 shows an example of a load/store pipeline in which the proxy identifier is used in place of the physical address for buffered load/store operations.

FIG. 12 shows an example of a pipeline for handling load/store (data access) operations. The virtual address for a data access operation is calculated at an address generating stage 60. A proxy ID generating stage 700 generates the proxy ID for the data access operation. The proxy ID output by the proxy ID generating stage 700 can for example be formed as a concatenation of the partial proxy ID stored in the corresponding TLB entry and lower address bits of the virtual address, which specify the page offset within the page of addresses mapped to the corresponding TLB entry (alternatively, the lower address bits could be viewed as part of the memory access attributes for a data access operation, in which case the proxy ID can simply be the value stored in the TLB entry). The data access operations are provided to at least one buffer 702, which buffers one or more pending data access operations awaiting processing. Each buffer entry stores information for the respective data access operations, including the proxy identifier in place of the physical address of the data access operation. For example, the buffer could be the store buffer 40, load buffer 120 or load queue 100 shown in the example of FIG. 8 (in some cases there may be a number of separate buffers for different purposes). While in the buffer, various operations such as merging of store operations, checking of hazards etc. can be performed based on the proxy identifier. For example, two or more store operations corresponding to the same thread specifying the same proxy identifier (and hence mapping to the same physical address) can be merged to form a single merged store operation. Subsequently, when a data access operation from the buffer is selected for servicing, a physical address lookup stage 704 looks up the physical address of the transaction in the TLB 30, and the physical address is then used to access memory for the load/store operation.

Hence, a proxy ID is used to represent the Physical Address (PA) of the accesses. The ID could be any ID that can be used as an exact representation of the PA. One possible Proxy ID is the Translation Lookaside Buffer (TLB) ID of the PA's page combined with the lower address bits. The page ID can be saved within the TLB or could simply be the TLB hit Index. This ID can be significantly smaller than the actual PA and is likely to be less than a quarter the size of the real PA. The readout of the PA can be done much later in the lifetime of the store and only read for the final store. Additionally it does not require that the PA be stored in any of the buffering logic. In many modern microprocessors the PA could be 30-40 bits or even more, while a proxy ID such as a TLB ID plus lower address bits could be as few as 9 bits. In one possible implementation the proxy ID is maintained to be correct across VA/PA aliases and across threads so that it has a 1:1 match with the PA.

During the store lifecycle the actual update to the internal caches or write to the next level of memory can be scheduled such that the PA can be read (from a TLB or other structure) or generated just in time to be used, making it easy to generate the PA only when it is actually needed.

While this invention applies to all types of memory it is particularly advantageous for memory types that allow merging of writes before a cache or memory update. Using the smaller proxy ID means that the store PA only has to be read at the time of the actual memory update. This multiplies the savings of not having to pipeline and store the PA. This eliminates the PA flops in the store pipeline and also in any store buffering hardware.

The approach shown in FIG. 12 could be used for either load or store operations, but can be particularly useful for store operations, which trigger a data value to be written to memory. Hence, it is not essential to use this technique for both loads and stores—e.g. some implementations may use the technique shown in FIG. 12 for the store pipeline, but may still handle loads with a physical address lookup at an earlier stage.

In addition to the direct storage and power savings associated with the pipelining and storage of the PA reading the PA at a later time can have second order effects. For structures such as a TLB, load operations generally need their PA much earlier than stores do. This means that there can be significant timing pressure on the load translation. By relaxing the store translation and reading the PA at a later time it removes the critical read port from the store functionality. This allows for less device loading on the critical load path and better placement of the load logic.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:

processing circuitry to process data access operations specifying a virtual address of data to be loaded from or stored to a data store;

proxy identifier storage circuitry comprising a plurality of entries each corresponding to a corresponding page of virtual addresses and storing a stored portion of a proxy identifier to be used for data access operations specifying a virtual address in the corresponding page of virtual addresses, wherein the stored portion of the proxy identifier has fewer bits than a physical page address identifying a page of physical addresses corresponding to the corresponding page of virtual addresses, and the proxy identifier storage circuitry is configured to support two or more entries specifying the same stored portion of the proxy identifier for two or more different pages of virtual addresses each of which corresponds to the same page of physical addresses;

setting circuitry to set the stored portion of the proxy identifier for each entry of the proxy identifier storage circuitry to provide 1:1 matching between the stored portion of the proxy identifier and the physical page address, so that two data access operations specifying different virtual page addresses mapping to the same physical page address are mapped to the same stored portion of the proxy identifier, and two data access operations specifying different virtual page addresses mapping to different physical page addresses are mapped to different stored portions of the proxy identifier;

proxy identifier determining circuitry to determine the proxy identifier for a data access operation to be processed by the processing circuitry, the proxy identifier having fewer bits than a physical address corresponding to the virtual address specified by the data access operation, wherein the proxy identifier determining circuitry is configured to determine the proxy identifier for a given data access operation based on combining page offset bits of the virtual address specified by the data access operation with the stored portion of the proxy identifier read from an entry of the proxy identifier storage circuitry corresponding to a page of virtual addresses including the virtual address specified by the given data access operation;

wherein the processing circuitry comprises at least one buffer to buffer information associated with one or more pending data access operations awaiting processing, said information comprising the proxy identifier determined by the proxy identifier determining circuitry for each of said one or more pending data access operations, wherein the proxy identifier stored in the at least one buffer comprises both the stored portion of the proxy identifier having the 1:1 matching with the physical page address, and the page offset bits of the virtual address;

address translation circuitry to determine the physical address corresponding to the virtual address specified for a data access operation after that data access operation has progressed beyond said at least one buffer; and checking circuitry to identify whether at least two pending data access operations correspond to the same physical address, in dependence on a comparison of the proxy identifiers determined for said at least two pending data access operations, the checking circuitry comprising a comparator to compare N-bit proxy identifiers for said at least two pending data access operations, wherein N is less than a number of bits in the physical page address;

wherein in response to detecting that said at least two pending data access operations correspond to the same physical address, when said at least two pending data access operations comprise at least two store operations of the same software thread, the checking circuitry is configured to trigger merging of said at least two store operations to form a merged store operation; and wherein the checking circuitry is configured to trigger the merging of said at least two store operations based on the comparison of the proxy identifiers before looking up a TLB for obtaining the physical address for the merged store operation, and subsequently to triggering the merging, looking up the TLB to obtain the physical address for the merged store operation, wherein the checking circuitry is configured to support merging at least two store operations which specify different virtual addresses mapping to the same physical address, based on detecting that the proxy identifiers are the same for the at least one two store operations.

2. The apparatus according to claim 1, wherein the proxy identifier storage circuitry comprises a translation lookaside buffer (TLB) for which each entry also specifies address mapping data, wherein the address translation circuitry is configured to determine the physical address corresponding to the virtual address specified for the given data access operation using the address mapping data stored in the entry of the TLB corresponding to a page of virtual addresses including the virtual address of the given data access operation.

3. The apparatus according to claim 1, comprising alias control circuitry to detect an alias condition when a new entry to be allocated to the proxy identifier storage circuitry is an aliased entry corresponding to a page of virtual addresses mapping to the same page of physical addresses as a block of virtual addresses corresponding to an existing entry of the proxy identifier storage circuitry.

4. The apparatus according to claim 3, wherein when allocating a new entry corresponding to a page of virtual addresses which is different to each page of virtual addresses corresponding to an existing valid entry of the proxy identifier storage circuitry, the alias control circuitry is configured to set the proxy identifier for the new entry based on an entry identifier identifying the location of the new entry within the proxy identifier storage circuitry.

5. The apparatus according to claim 4, wherein the proxy identifier storage circuitry comprises a translation lookaside buffer (TLB) for which each entry also specifies address mapping data, and the address translation circuitry is configured to determine the physical address corresponding to the virtual address specified for the given data access operation using the address mapping data stored in the entry of the TLB identified by the proxy identifier for the given data access operation.

6. The apparatus according to claim 3, wherein in response to detecting the alias condition, the alias control circuitry is configured to set the proxy identifier stored in the new entry to be equal to the proxy identifier indicated by the existing entry.

7. The apparatus according to claim 3, wherein following detection of the alias condition, the alias control circuitry is configured to prevent said existing entry being deallocated from the proxy identifier storage circuitry when there is at least one valid aliased entry of the proxy identifier storage circuitry which maps to the same page of physical addresses as the existing entry.

8. The apparatus according to claim 1, wherein the proxy identifier determining circuitry is configured to determine the same proxy identifier for data access operations from different software threads which correspond to the same physical address.

9. The apparatus according to claim 1, wherein the checking circuitry is configured to prevent merging of at least two store operations from different software threads even when the at least two store operations correspond to the same physical address.

10. A data processing method comprising:

storing, in proxy identifier storage circuitry, a plurality of entries each corresponding to a corresponding page of virtual addresses and storing a stored portion of a proxy identifier to be used for data access operations specifying a virtual address in the corresponding page of virtual addresses, wherein the stored portion of the proxy identifier has fewer bits than a physical page address identifying a page of physical addresses corresponding to the corresponding page of virtual addresses, the proxy identifier storage circuitry is configured to support two or more entries specifying the same stored portion of the proxy identifier for two or more different pages of virtual addresses each of which corresponds to the same page of physical addresses, and the stored portion of the proxy identifier for each entry of the proxy identifier storage circuitry is set to provide 1:1 matching between the stored portion of the proxy identifier and the physical page address, so that two data access operations specifying different virtual page addresses mapping to the same physical page address are mapped to the same stored portion of the proxy identifier, and two data access operations specifying different virtual page addresses mapping to different physical page addresses are mapped to different stored portions of the proxy identifier;

in response to a data access operation specifying a virtual address of data to be loaded from or stored to a data store:

determining the proxy identifier having fewer bits than a physical address corresponding to the virtual address specified by the data access operation, wherein the proxy identifier is determined based on combining page offset bits of the virtual address specified by the data access operation with the stored portion of the proxy identifier read from an entry of the proxy identifier storage circuitry corresponding to a page of virtual addresses including the virtual address specified by the given data access operation;

buffering information associated with the data access operation in at least one buffer, said information comprising the proxy identifier, wherein the proxy identifier stored in the at least one buffer comprises both the stored portion of the proxy identifier having the 1:1 matching with the physical page address, and the page offset bits of the virtual address;

after the data access operation has progressed beyond the at least one buffer, determining the physical address corresponding to the virtual address specified for the given data access operation;

identifying whether at least two pending data access operations correspond to the same physical address, in dependence on a comparison of the proxy identifiers determined for said at least two pending data access operations, using a comparator to compare N-bit proxy identifiers for said at least two pending data access operations, wherein N is less than a number of bits in the physical page address;

in response to detecting that said at least two pending data access operations correspond to the same physical address, when said at least two pending data access operations comprise at least two store operations of the same software thread, triggering merging of said at least two store operations to form a merged store operation; and triggering the merging of said at least two store operations before looking up a TLB for obtaining the physical address for the merged store operation, wherein at least two store operations which specify different virtual addresses mapping to the same physical address are allowed to be merged based on detecting that the proxy identifiers are the same for the at least one two store operations.

* * * * *